United States Patent [19]
Cross et al.

[11] 3,940,766
[45] Feb. 24, 1976

[54] RANGE AND ANGLE DISCRIMINATOR FOR LEADING EDGE RADAR TRACKING

[75] Inventors: David C. Cross; Dean D. Howard, both of Oxon Hill, Md.

[73] Assignee: The United States of America as represented by the Secretary of the Navy, Washington, D.C.

[22] Filed: Apr. 5, 1973

[21] Appl. No.: 349,517

[52] U.S. Cl. ................................................ 343/7.4
[51] Int. Cl.² ......................... G01S 9/02; G01S 9/52
[58] Field of Search ..................... 343/5 DP, 7.3, 7.4

[56] References Cited
UNITED STATES PATENTS

| | | | |
|---|---|---|---|
| 3,359,442 | 12/1967 | Groginsky | 343/5 DP |
| 3,430,235 | 2/1969 | Bender et al. | 343/5 DP |
| 3,725,928 | 4/1973 | Klimchak | 343/5 DP X |
| 3,729,737 | 4/1973 | Asam | 343/7.3 |
| 3,761,922 | 9/1973 | Evans | 343/5 DP |
| 3,795,909 | 3/1974 | Vehrs, Jr. | 343/5 DP X |

*Primary Examiner*—Malcolm F. Hubler
*Attorney, Agent, or Firm*—R. S. Sciascia; Arthur L. Branning; William W. Cochran

[57] ABSTRACT

The disclosed invention provides an accurate, simple and flexible method for processing the receiver output of a high range resolution monopulse tracking radar to generate range and angle tracking error voltages based on the location of only the leading edge of the target echo replacing the conventional analog range error detectors and angle error processors in closed tracking loop systems. The invention also processes the radar return signal to avoid interference from repeater jammers or multipath returns at low angle tracking.

10 Claims, 14 Drawing Figures

RANGE AND ANGLE DISCRIMINATOR FOR LEADING EDGE RADAR TRACKING

BACKGROUND OF THE INVENTION

Conventional leading edge monopulse radar range error detectors operate effectively only with "long" pulse lengths usually on the order of .1 microseconds or longer. These detectors normally incorporate threshold devices to generate a "clean" video pulse indicating the leading edge of the return signal. Analog circuitry is then used to track the video pulse. Typical analog circuitry use various methods for tracking such a double differentiating the range video return signal and detecting subsequent zero crossings to determine the leading edge. These schemes however do not provide accurate angle tracking data on the leading edge only. They have limited use with wideband data since noise induced threshold crossings are prevalent in such data. Due to advancing state of the art, wideband receivers having high range resolution offer many advantages over the prior systems. As a result, an alternate approach is needed for leading edge tracking which is compatible with the wideband data.

SUMMARY OF THE INVENTION

It is therefore an object of the present invention to provide a leading edge tracker which is compatible with wideband, high range resolution radar receivers.

Other objects, advantages and novel features of the invention will become apparent from the following detailed description of the invention when considered in conjunction with the accompanying drawings.

The present invention uses high speed digital sampling and data processing techniques to achieve these results. The leading edge of the return range video signal is determined by summing the stored digital value of successive groups of range video data and comparing each of these groups to an automatic threshold value generated by sampling the background noise of the range video signal such that when the summed value exceeds the automatic threshold value a leading edge is indicated. The position of the leading edge is stored in memory and used by both the azimuth and elevation control circuitrty for generating error voltages which are used in a closed loop tracking system.

DETAILED DESCRIPTION

Figure 1:
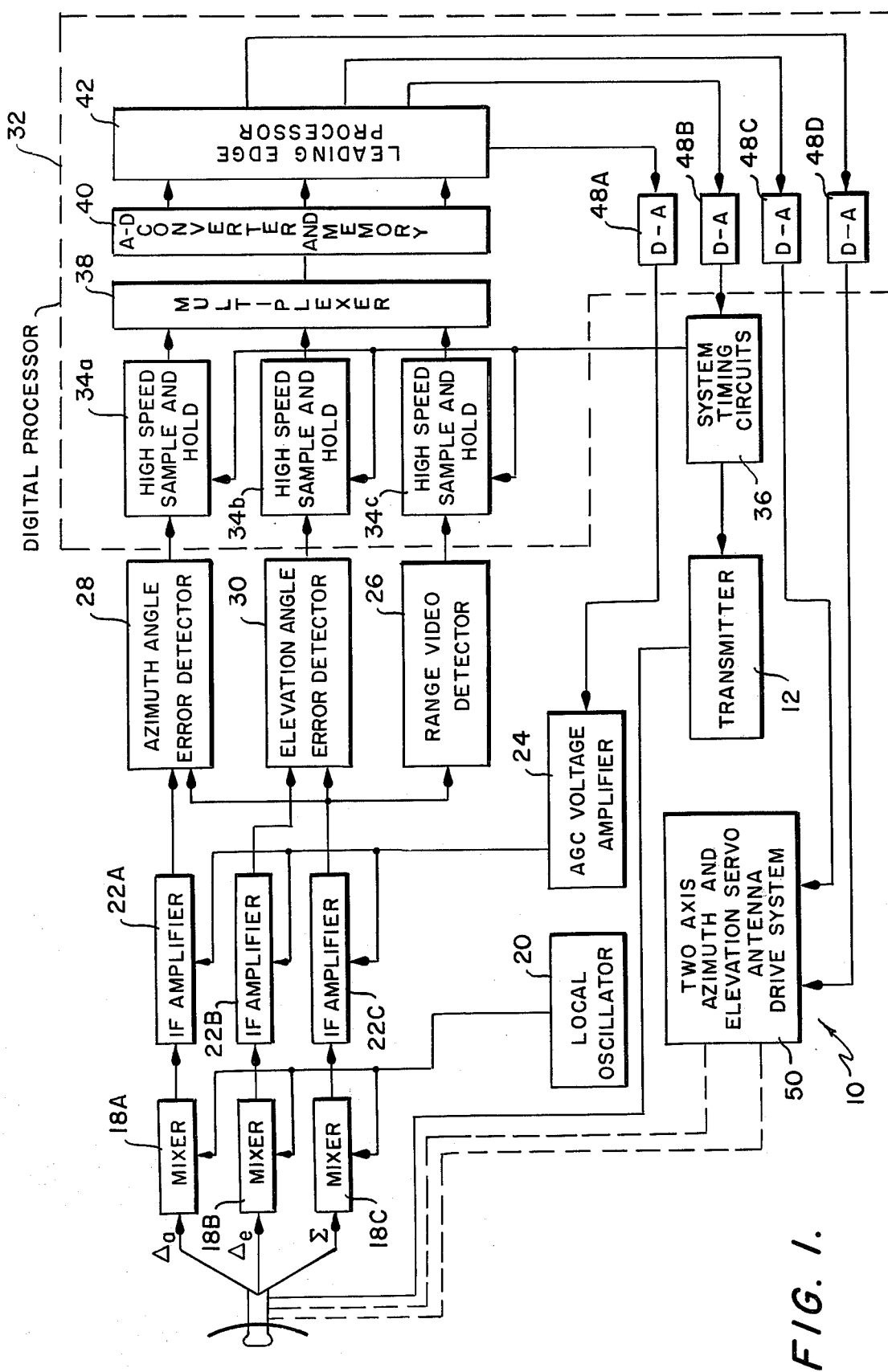
FIG. 1 is a block diagram of the entire system of the preferred embodiment.

FIG. 1 shows a block diagram of a conventional monopulse closed loop servo control system as previously disclosed in application Ser. No. 136,946, now U.S. Pat. No. 3,718,927 for AN AUTOMATIC DIGITAL ERROR DETECTOR FOR RANGE RADAR TRACKING by Dean D. Howard and David C. Cross, with the addition of a leading edge processor 42 comprising the improvement of the preferred embodiment. In general, the system uses high resolution range and angle video information to generate tracking error voltages. These error voltages provide the inputs to conventional range and angle servo control circuitry. The error voltages generated by the invention are an indication of the errors in centering the range gate and radar pencil beam on the leading edge of the target. As a closed-loop tracking system the error detectors 28 and 30, leading edge processor 42, and servo controls 50 will maintain the range gate centered on the leading edge of the video return and the radar beam normal to the phase front reflected by the leading edge of the target. By virtue of the sampled and stored data any undesired portions of the target echo may be readily rejected.

The invention requires that the wideband video of the monopulse channels (i.e., range, azimuth and elevation) be sampled and stored in digital format. However, the video signals need only be sampled in the vicinity of the target. In addition, the invention requires that the average noise level in the range video channel be determined. This is done by sampling the video just prior to receiving the target return.

FIGS. 2A through 2J illustrate the type of sampling performed by the device of FIG. 1. The samplers are similar to the type used in sampling scopes. The range tracking system in the radar provides gates to initiate both the target and noise sampling, shown as trigger pulses in FIGS. 2B and 2D.

Figure 3A:
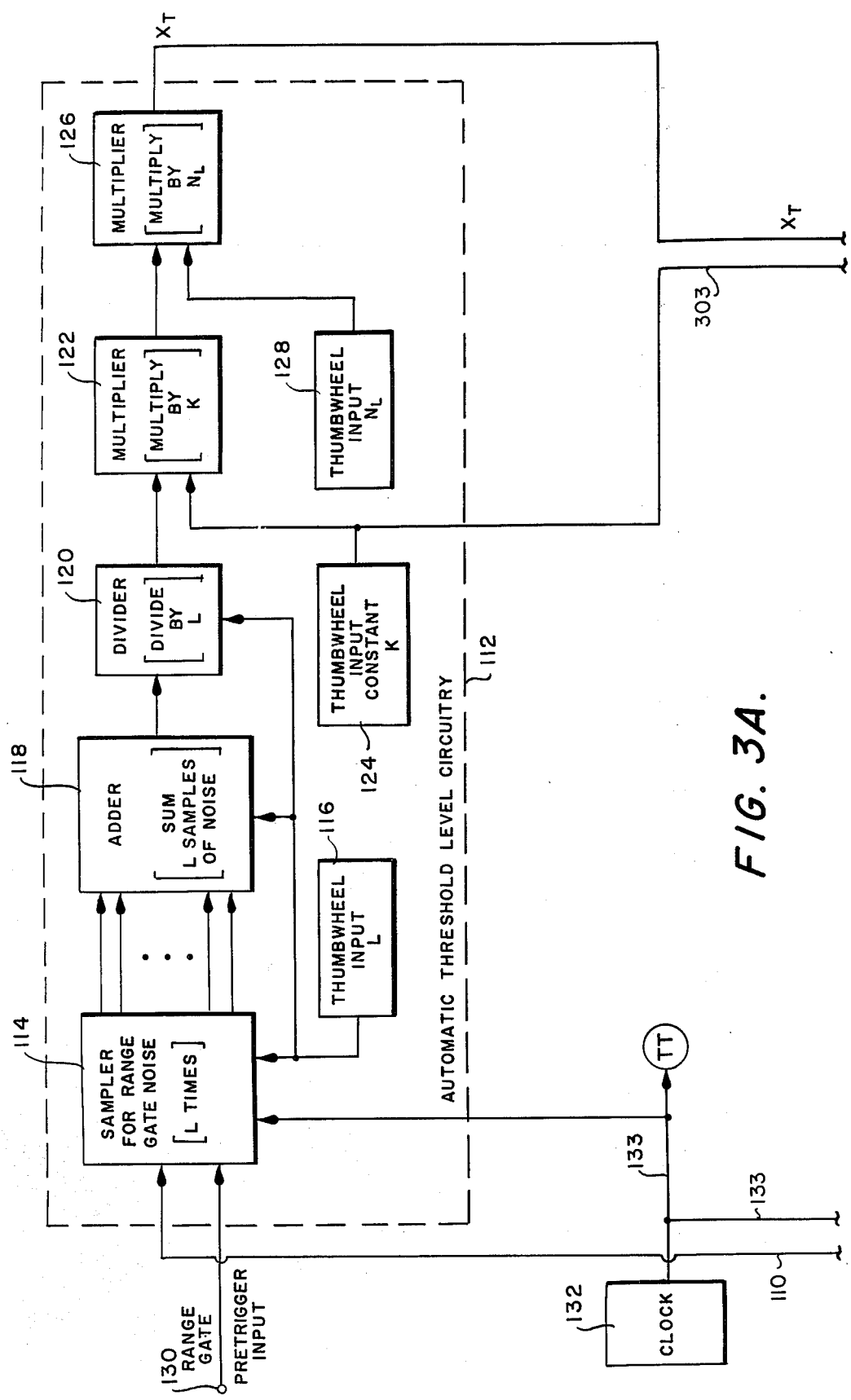
FIGS. 3A and 3B are a block diagram of the range error detector portion of the leading edge detector.
Figure 3B:
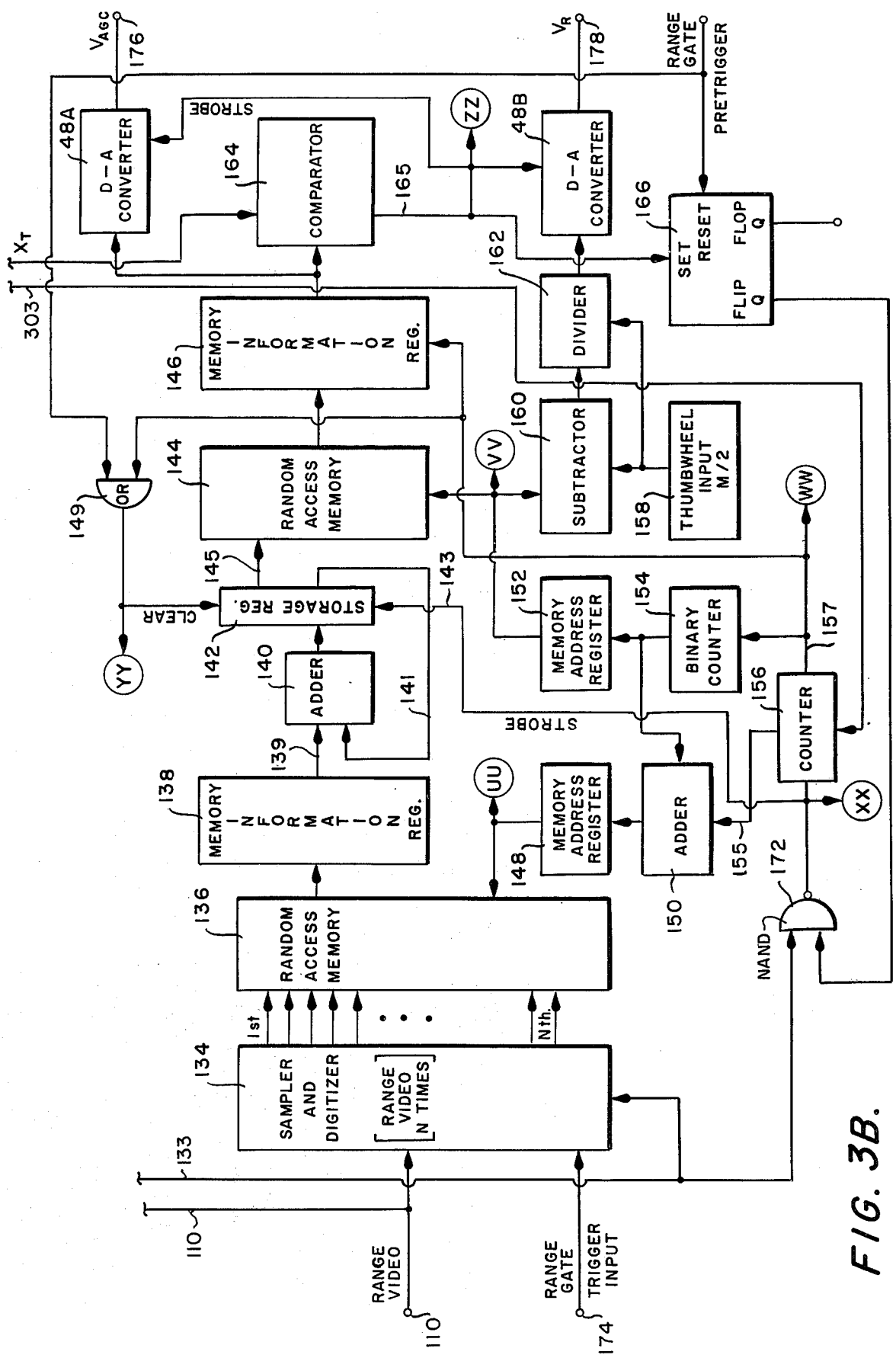

FIG. 3 shows a detailed view of the leading edge processor 42 which processes the sampled data to generate error voltages to control the system timing circuits 36 via D to A converter 48B, and automatic gain control voltages for AGC voltage amplifier 24 via D to A converter 48A. The range video is fed to the leading edge processor from A to D converter 40, FIG. 1, via range video input 110, FIG. 3. The range video is fed to both an automatic threshold level device 112 and a sampler and digitizer 134.

Figure 2A:
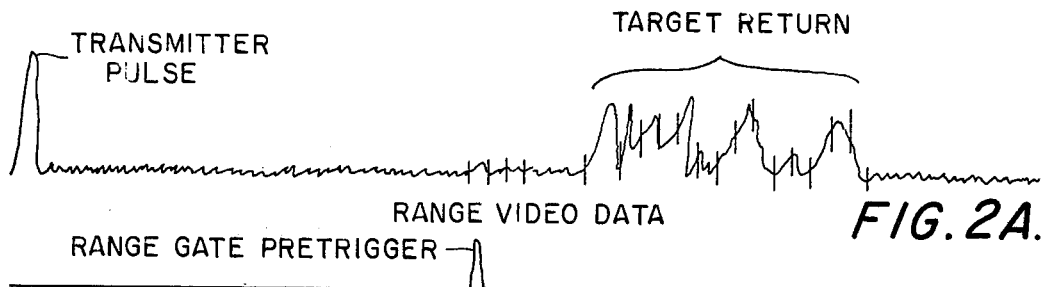
FIGS. 2A through 2J show various signals produced by the preferred embodiment.
Figures 2B, 2C:
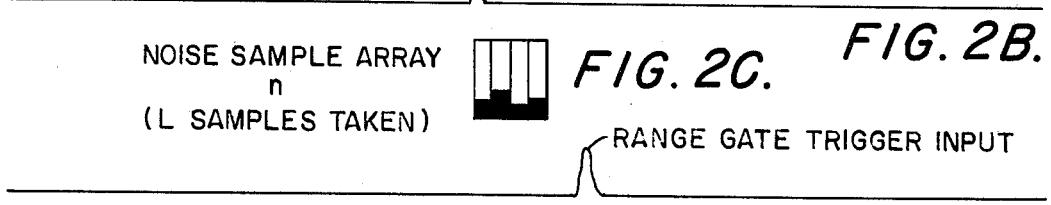

Automatic threshold level circuitry 112 generates a threshold signal from the sampled background noise. A pretrigger input for the range gate is fed to sampler 114 via input 130. The pretrigger input is shown in FIG. 2B. Adjustable thumbwheel input 116 selects the number of samples to be made by sampler 114; in this case L samples. Adder 118 adds the samples to get a sum which is fed to divider 120 which divides the sum by the selected value L to give an indication of the average noise. This average noise level is subsequently fed to a multiplier 122 which multiplies this level by a value K equal to the number of range video samples added together in adder 140 as explained below. Multiplier 126 in turn multiplies this value by an operator selected value $N_L$ to assure that the value of the threshold $X_T$ exceeds the background noise level. Thus $X_T$ represents a threshold value for the sum of K range video signals.

Figures 2D, 2E:
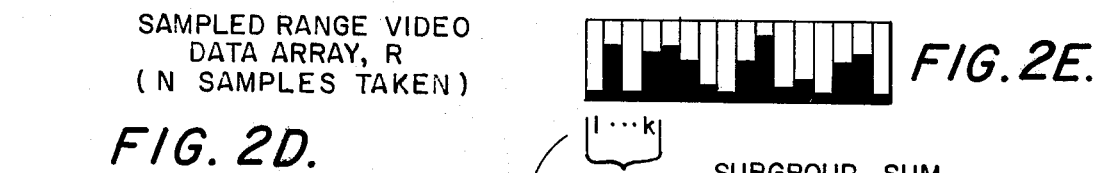

The range video signal is also fed to sampler and digitizer 134 which samples the range video N times signaled by range gate trigger input 174 shown in FIG. 2D. The output of the sampler and digitizer 134 is fed to a random access memory 136 which is capable of "dumping" into memory information register 138, the information which it has stored in those memory units which are addressed by memory address register 148. Thus the range video information is serially fed to sampler and digitizer 134 and stored in the first N locations of random access memory 136 where it can be addressed in the manner prescribed by memory address register 148 for feed out to memory information register 138 and adder 140 for summing. The manner in which the memory address register 148 addresses the random access memory 136 can be more fully explained by reference to FIG. 2F.

Figure 2F:
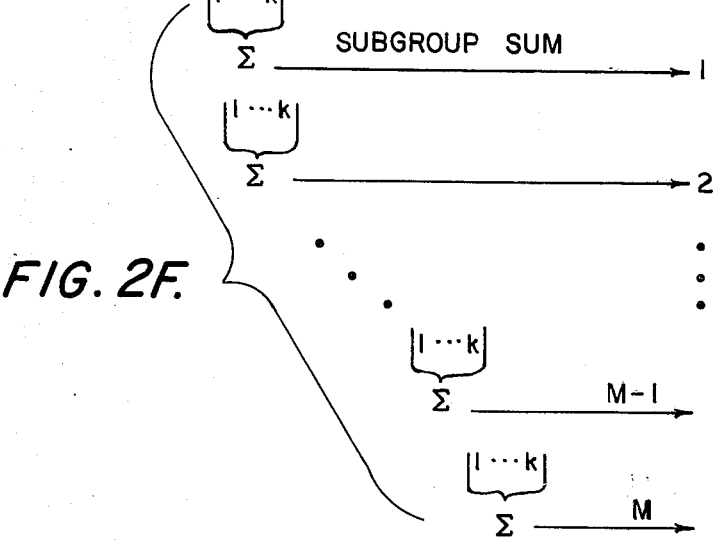
Figure 2G:
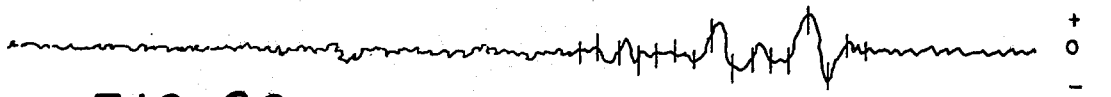
Figure 2H:

The desired addressing sequences are shown in FIG. 2F. As shown, M subgroups are desired which consist of sequential sums of K range video samples. As shown in FIG. 2F, K = 4. Thus subgroup 1 would equal the sum of the first four range video samples as shown in FIG. 2E. Subgroup 2 would equal the sum of the second through the fifth range video samples, and so on. This addressing sequence is achieved by the apparatus of FIG. 3 in the following manner.

The clock pulses from clock 132 are fed via output 133 to counter 156 via nand gate 172. Output 155 counts sequentially up to the value K which is determined by thumbwheel input 124 via output 303. In addition counter 156 produces an output pulse on line 157 each time the Kth value is reached. These pulses are accumulated in counter 154. These outputs are added in adder 150 and fed to memory address register 148. The value of the binary counter 154 thus in effect steps up the sequential values produced on output 155 by the value of one for each cycle, thereby addressing sequential sums as desired and shown in FIG. 2F.

The sums of the addressed memory positions are produced by adder 140 as noted above. Storage register 142 is located in the feedback loop of the adder 140. For each clock pulse produced for the counter 156 via nand gate 172 the storage register is strobed via input 143. It stores the value of the output of adder 140, "dumping" via output 141 the previous value that was stored therein. The result is that the values which are fed to adder 140 are accumulated in this closed loop system. After K values have been added or a new range video signal is being processed, the value of the storage register 142 which represents the sum of K range video samples is "dumped" in random access memory 144 via output 145 where it is stored. The storage register's "clear" and "dump" signal is produced by "or" gate 149. Memory address register 152 addresses the particular memory address in the random address memory 144 to be "dumped". The address produced by memory address register 152 corresponds to the sequential subgroup as accumulated in binary counter 154. Memory information register 146 channels the subgroup sums indicated in FIG. 2F from the output of the random access memory 144 to comparitor 164 as they are addressed.

Each subgroup value is compared with the value $X_T$ of the automatic threshold signal. If the subgroup sum exceeds the value $X_T$ produced by the automatic threshold circuitry, a signal is produced by the comparitor at output 165. This output is used to "strobe on" digital to analog converters 48A and 48B. It also sets flip-flop 166 which is connected to nand gate 172 to stop counter 156 from counting when a favorable comparison has been made.

When a favorable comparison has been made, D to A converter 48A converts the digital value of the signal which exceeded the threshold value $X_T$ to an analog voltage which is fed to AGC voltage amplifier 24 which operates the gain of the system as disclosed in the previously mentioned patent.

D to A converter 48B converts the digital value of the range error signal to analog form to be fed to system timing circuits 36 which control the system as also disclosed in the previously mentioned patent. The digital range error signal is produced by elements 158, 160 and 162 of FIG. 3. Subtractor 160 takes the value of signal stored in the memory address register 152 and subtracts the value set on thumbwheel input 158. The resultant value is then divided in divider 162 by the same value set on thumbwheel 158. The value set on thumbwheel 158 is ½M where M equals the number of subgroup sums, or
$$M = N - K + 1$$
where:

N = number of range video samples;
K = number of samples in each subgroup;
as disclosed above. The result is that half of the total number of subgroups is subtracted from the subgroup indication at the output of memory address register 152. That value is in turn divided by half the total number of subgroups. Thus the error signal output of divider 162 can vary between −1 and +1 depending on the value at the output of memory address register 152. If the value of the memory address register 152 is equal to one half of the total number of samples N when D to A converter 48B is "strobed on", its output will be zero. Any variation of the detected leading edge of the return range video signal from the center location in random access memory 144 will result in a proportional change in output voltage at 178 so that adjustments can be made in the system timing circuits 36 as disclosed in the previously mentioned patent.

Figure 4:
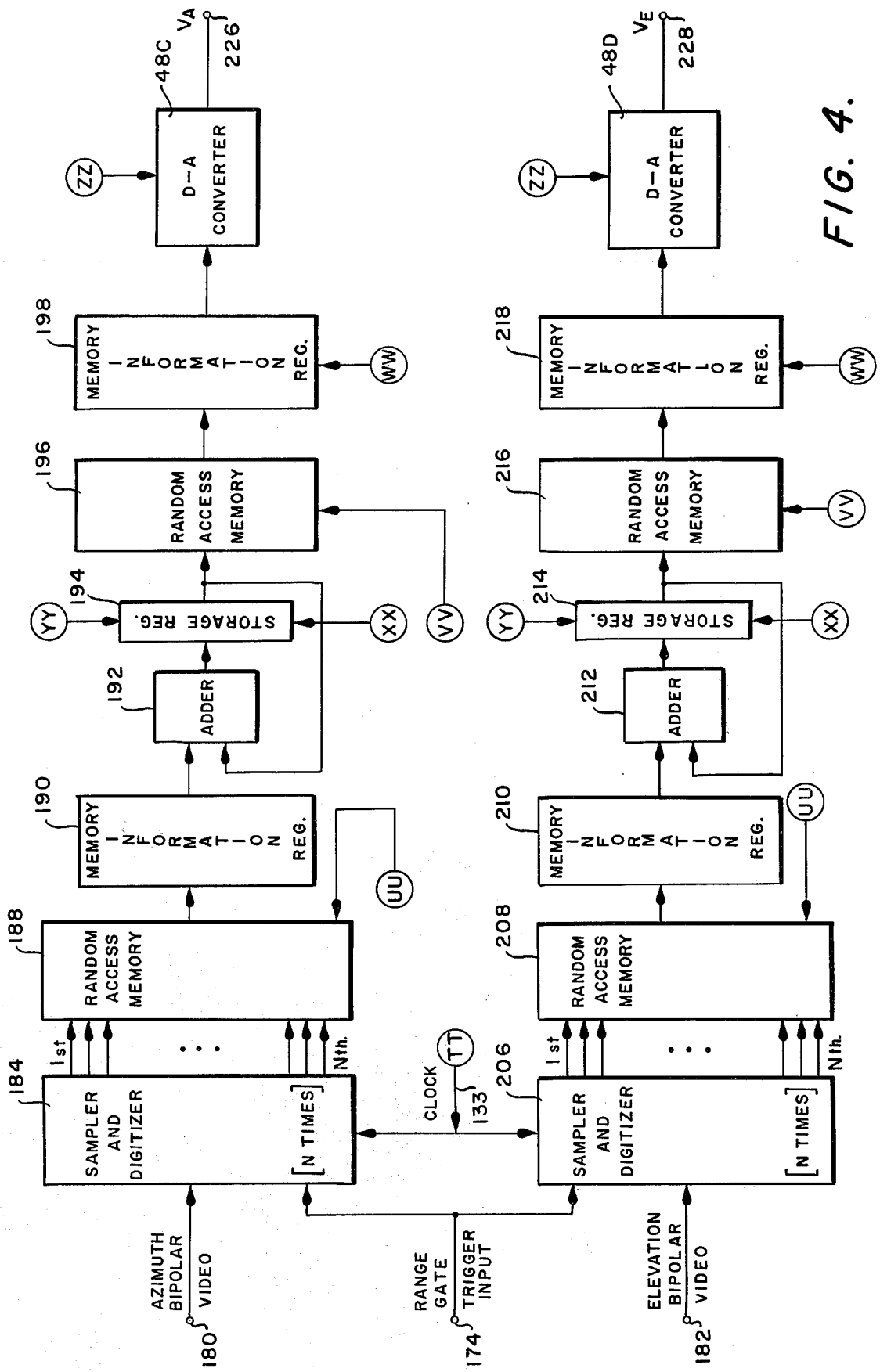
FIG. 4 is a block diagram of the angular error detection system of the leading edge detector.

The memory address and other information generated by the range error circuitry of FIG. 3 is used in the azimuth and elevation error circuitry of FIG. 4 to compute both azimuth and elevation error voltages to drive the servo device 50 of FIG. 1 which operates in the manner disclosed in the previously mentioned patent.

Considering first the azimuth error circuitry, sampler and digitizer 184 sample the azimuth input (FIG. 2G) 180 N times (FIG. 2H) and store these values in random access memory 188. Random access memory 188 is subsequently addressed by memory address register 148 of FIG. 3 over line uu in the same manner the random access memory 136 was addressed in the range error circuitry of FIG. 3 as previously disclosed. These values are subsequently fed through memory information register 190 which acts as an interface unit to adder and storage register 192 and 194 respectively where subgroup sums are formed of the azimuth bipolar video signal in the same manner as they were for the range video signals in FIG. 3. Random access memory 196 is sequentially addressed by memory address register 152 via line vv and fed through memory information register 198 which acts as an interface device. D to A converter 48C is "strobed on" via line zz upon a favorable comparison as explained above. The analog voltage $V_A$ produced at the output 226 of D to A converter 48C is an indication of the system's error in tracking in the azimuth coordinate. This voltage is used to drive the servo device 50 of FIG. 1 as disclosed above.

Figure 2I:
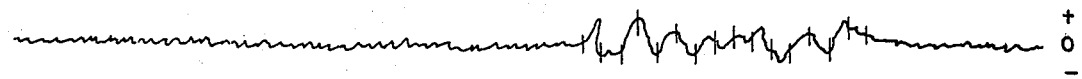
Figure 2J:

The elevation channel also shown in FIG. 4 operates in precisely the same manner as the azimuth channel except with elevation data (FIGS. 2I and 2J). The elevation error voltage $V_E$ is also used to drive the servo device 50 as disclosed above.

Clearly the disclosed system of leading edge tracking has many advantages over the prior art. By segmenting the target echo into range resolution bins in all three monopulse channels, the leading edge of the target can be accurately located because of the capability of the invention to effectively isolate the leading edge from the rest of the target. This allows receiver gain levels to be automatically controlled only by the signal from the leading edge of the target, thus stabilizing the leading edge return. By segmenting the angle tracking information into range bins, the target's leading edge can be accurately tracked in both azimuth and elevation coordinates. These are new features and are not found in other leading edge tracking schemes. The combination of high speed sampling and conventional digital processing techniques which can also be used to implement the invention allows the system to be extremely flexible. For example, the ability to estimate the average noise level near the target is easily accomplished using digital schemes and sampling techniques. This provides an adaptive threshold setting with a minimum of design complexity. Also the ability of the digital system to accept operator generated instruction allows the system to conveniently and simply adjust the different targets and environmental operating conditions. The use of digital processing techniques will allow the adaptive features sof this tracking scheme to be totally automated.

In general, both digital processing techniques and standard digital circuitry result in an adaptive flexible system which can be generated with the present state-of-the-art. This is compatible with the present trend in radar systems toward digital control. The invention provides a simple, flexible process to implement one more radar function with digital control.

This invention may also be implemented using analog techniques. In this mode, the sampled data are stored in analog storage devices such as a capacitor. The stored samples can then be processed using conventional summing, and differential amplifiers together with analog threshold comparators. However, the scheme is more naturally suited to digital processing techniques. Limited versions of the invention could be implemented where less performance is acceptable and reduced cost is necessary.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. In a conventional monopulse closed loop digital tracking system, a method of determining the leading edge of a return video signal comprising the steps of:
   deriving the improvement in a threshold signal from said return video signal;
   sequentially sampling said return video signal;
   summing said samples over successive intervals;
   addressing said summed successive intervals;
   comparing said threshold signal with each of said summed successive intervals;
   indicating the location of said address when any of said summed successive intervals exceeds said threshold signal;
   converting a signal representative of said address location to analog form which is indicative of the leading edge of the return video signal.

2. The method of claim 1 including the further steps of:
   simultaneously summing samples over successive intervals of said return video signal representative of bipolar angle information;
   converting to analog form the summed successive interval having an address location corresponding to said indicated address location.

3. The method of claim 1 wherein said step of deriving a threshold signal comprises the further steps of:
   sampling background noise a predetermined number of times from said video signal;
   adding the amplitudes of said sampled background noise;
   dividing said added amplitudes by the number of samples to derive an average noise level.

4. The method of claim 3 including the further steps of:
   simultaneously summing samples over successive intervals of said return video signal representative of bipolar angle information;
   converting to analog form the summed successive interval having an address location corresponding to said indicated address location.

5. In a conventional monopulse, closed loop, digital tracking system having a video return signal supplied from range and bipolar azimuth angle and elevation angle tracking channels, a leading edge tracker comprising:
   automatic threshold means for deriving a threshold signal from the video signal;
   means for sequentially sampling said video signal;
   accumulating means for summing said samples over sequential intervals;
   comparison means for comparing each summed sequential interval with said threshold value and indicating when any of said summed sequential intervals exceeds said threshold value; and
   means for generating error signals from said indication to correct errors in tracking.

6. The system of claim 5 wherein said means for generating an error signal comprises;
   memory means for addressing corresponding summed sequential intervals of the range and bipolar angle video signal;
   means connected to said memory means for converting to analog form a signal indicative of the address location of the summed interval of range video in said memory means when said summed interval exceeds said threshold value; and
   additional means connected to said memory means for converting to analog form a signal indicative of the summed sequential interval of bipolar angle video corresponding in address to said indicated range address.

7. The system of claim 5 wherein said system further includes means for controlling said accumulating means to sum a fixed number of sequential samples in each sequential interval, and means for causing the initial sample of each sequential interval to be the first sequential sample following the initial sample of the preceeding interval.

8. The system of claim 5 wherein said automatic threshold means comprises:
   means for sampling background noise from said video signal a predetermined number of times;
   means for accumulating the amplitudes of said sampled background noise;
   means for dividing said accumulated amplitudes by the number of said predetermined samples to get an average value for said background noise;

means for multiplying said average value of said background noise by another predetermined number.

9. The system of claim 8 wherein said means for generating error signals comprises:
   memory means for addressing sequential intervals of said video signal;
   D to A converter means connected to said memory means for converting to analog form a signal indicative of the address location of said memory means when a summed sequential interval exceeds said threshold value to indicate an error in tracking.

10. The system of claim 9 wherein said means for generating error signals comprises:
   additional D to A converter means connected to said memory means for converting to analog form a signal indicative of summed sequential intervals of a bipolar angular signal derived from said system.

* * * * *